(12) United States Patent
Yoo et al.

(10) Patent No.: US 11,589,383 B2
(45) Date of Patent: Feb. 21, 2023

(54) TECHNIQUES FOR RESERVATION PREAMBLE FOR LOW LATENCY DETECTION IN A NEW RADIO SHARED SPECTRUM COMMUNICATION SYSTEM

(71) Applicant: QUALCOMM Incorporated, San Diego, CA (US)

(72) Inventors: Taesang Yoo, San Diego, CA (US); Jing Lei, San Diego, CA (US); Juan Montojo, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 16/871,971

(22) Filed: May 11, 2020

(65) Prior Publication Data

US 2020/0275478 A1 Aug. 27, 2020

Related U.S. Application Data

(62) Division of application No. 15/811,138, filed on Nov. 13, 2017, now Pat. No. 10,687,355.

(Continued)

(51) Int. Cl.
*H04W 74/00* (2009.01)
*H04L 5/00* (2006.01)
(Continued)

(52) U.S. Cl.
CPC ......... *H04W 74/004* (2013.01); *H04L 5/0007* (2013.01); *H04W 16/14* (2013.01);
(Continued)

(58) Field of Classification Search
None
See application file for complete search history.

(56) References Cited

U.S. PATENT DOCUMENTS 6,330,460 B1 12/2001 Wong et al.
8,787,266 B2 7/2014 Matischek et al.
(Continued)

FOREIGN PATENT DOCUMENTS

WO 2015054294 A2 4/2015
WO 2015126782 A1 8/2015
WO 2016086982 A1 6/2016

OTHER PUBLICATIONS

Motorola: Uplink Common Control Channel', 3GPP TSG RAN1 #49-bis, 3GPP Draft; R1-072711 UL_CCCH, 3rd Generation Partnership Project (3GPP), Mobile Competence Centre, 650, Route Des Lucioles, F-06921 Sophia-Antipolis Cedex, France, vol. RAN WG1, No. Orlando, USA, Jun. 25-29, 2007, Jun. 20, 2007 (Year: 2007).*

(Continued)

*Primary Examiner* — Shripal K Khajuria
(74) *Attorney, Agent, or Firm* — ArentFox Schiff LLP

(57) ABSTRACT

Methods and apparatuses for transmitting and detecting channel reservation preamble in a NR shared spectrum are described. An aspect may include determining whether a first reservation preamble of a first operator is received on a first time slot of multiple time slots of a downlink channel from a first network entity, and transmitting a second reservation preamble of the first operator on an uplink channel to the second network entity. Another aspect may include generating a first reservation preamble of a first operator based on at least one of a compressed representation in a signal space, a basis function of the signal space, or a CAZAC sequences; and transmitting, on a first timeslot of multiple time slots of a downlink channel, the first reservation preamble of the first operator to at least a UE.

28 Claims, 12 Drawing Sheets

Related U.S. Application Data

(60) Provisional application No. 62/422,919, filed on Nov. 16, 2016.

(51) Int. Cl.
   | | | |
   |---|---|---|
   | *H04W 16/14* | (2009.01) | |
   | *H04W 72/1268* | (2023.01) | |
   | *H04W 88/04* | (2009.01) | |
   | *H04W 74/08* | (2009.01) | |
   | *H04W 88/06* | (2009.01) | |

(52) U.S. Cl.
   CPC ....... *H04W 72/1268* (2013.01); *H04L 5/0021* (2013.01); *H04W 74/0816* (2013.01); *H04W 88/04* (2013.01); *H04W 88/06* (2013.01)

(56) References Cited

U.S. PATENT DOCUMENTS

| | | | |
|---|---|---|---|
| 9,194,936 | B1* | 11/2015 | Keegan .................. G01S 5/0221 |
| 9,204,461 | B2 | 12/2015 | Kwon et al. |
| 9,357,564 | B2 | 5/2016 | Bertrand et al. |
| 9,750,018 | B2* | 8/2017 | Chen .................... H04W 72/048 |
| 9,763,225 | B2 | 9/2017 | Ji et al. |
| 9,949,315 | B2 | 4/2018 | Damnjanovic et al. |
| 2005/0169231 | A1 | 8/2005 | Bennett |
| 2008/0170530 | A1 | 7/2008 | Connors et al. |
| 2010/0255867 | A1 | 10/2010 | Ishii et al. |
| 2014/0112289 | A1 | 4/2014 | Kim et al. |
| 2014/0204915 | A1 | 7/2014 | Pelletier et al. |
| 2014/0286240 | A1* | 9/2014 | Kim ...................... H04W 76/28 370/328 |
| 2016/0286545 | A1 | 9/2016 | Luo et al. |
| 2017/0118315 | A1* | 4/2017 | Sun .................... H04L 27/2613 |
| 2017/0223740 | A1 | 8/2017 | Mallik et al. |
| 2017/0238342 | A1 | 8/2017 | Yang et al. |
| 2018/0139777 | A1 | 5/2018 | Yoo et al. |
| 2018/0167848 | A1 | 6/2018 | Lei et al. |

OTHER PUBLICATIONS

European Search Report—EP20203712—Search Authority—The Hague—dated Nov. 13, 2020.

Motorola: "Uplink Common Control Channel", 3GPP TSG RAN1 #49-bis, 3GPP Draft; R1-072711 UL_CCCH, 3rd Generation Partnership Project (3GPP), Mobile Competence Centre, 650, Route Des Lucioles, F-06921 Sophia-Antipolis Cedex, France, vol. RAN WG1, No. Orlando, USA, Jun. 25-29, 2007, Jun. 20, 2007 (Jun. 20, 2007), 1 Page, XP050106398, [retrieved on Jun. 20, 2007], 2. Uplink Common Control Channel.

Taiwan Search Report—TW106139646—TIPO—dated Mar. 6, 2021.

Alcatel-Lucent Shanghai Bell, et al., "Hidden Node Problem and Potential Solutions for LAA", 3GPP TSG RAN WG1 Meeting #78bis, 3GPP Draft; R1-144084—Hidden Node—Final, 3rd Generation Partnership Project (3GPP), Mobile Competence Centre; 650, Route Des Lucioles; F-06921 Sophia-Antipolis Cedex; France, vol. RAN WG1, No. Ljubljana, Slovenia; Oct. 6, 2014-Oct. 10, 2014, Sep. 27, 2014 (Sep. 27, 2014), pp. 1-4, XP050872827, Retrieved from the Internet: URL: http://www.3gpp.org/ftp/tsg_ran/WG1_RL1/TSGR1_78b/Docs/ [retrieved on Sep. 27, 2014].

Huawei., et al: "Introduction of Licensed-Assisted Access using LTE," 3GPP Draft; 36300_CR0798R2_(REL-13)_R2-157173, 3rd Generation Partnership Project (3GPP), Mobile Competence Centre; 650, Route Des Lucioles; F-06921 Sophia-Antipolis Cedex; France, vol. RAN WG2, Anaheim, USA; Nov. 16, 2015-Nov. 20, 2015, Feb. 14, 2016 (Feb. 14, 2016), XP051056440, Retrieved from the Internet: URL: http://www.3gpp.org/ftp/Meetings_3GPP_SYNC/RAN4/Docs/ [retrieved on Feb. 14, 2016] 11 Pages.

International Preliminary Report on Patentability—PCT/US2017/061604, The International Bureau of WIPO—Geneva, Switzerland, dated Oct. 11, 2018.

International Search Report and Written Opinion—PCT/US2017/061604—ISA/EPO—dated Apr. 3, 2018.

Lucent Technologies: "Preceded FDM Reference Signals for SC-FDMA", 3GPP Draft; R1-061876, 3rd Generation Partnership Project (3GPP), Mobile Competence Centre; 650, Route Des Lucioles; F-06921 Sophia-Antipolis Cedex ; France vol. RAN WG1, no. Cannes, France; Jun. 27, 2006-Jun. 30, 2006 Jun. 20, 2006, XP050951283, Retrieved from the Internet: URL:http://www.3gpp.org/ftp/tsg_ran/WG1_RL1/TSGR1_AH/LTE_AH_0606/Docs/ [retrieved on Jun. 20, 2006], 7 pages.

Partial International Search Report—PCT/US2017/061604—ISA/EPO—dated Feb. 12, 2018.

Qualcomm Europe, "Structure and Performance of DL Dedicated RS",3GPP TSG-RAN WG1 #49-bis, R1-072746, 3rd Generation Partnership Project (3GPP), Mobile Competence Centre ; 650, Route Des Lucioles ; F-06921 Sophia-Antipolis Cedex; France,val. RAN WG1, no. USA Orlando, USA, Jun. 25-29, 2007, XP050106431.

* cited by examiner

TECHNIQUES FOR RESERVATION PREAMBLE FOR LOW LATENCY DETECTION IN A NEW RADIO SHARED SPECTRUM COMMUNICATION SYSTEM

CLAIM OF PRIORITY UNDER 35 U.S.C. § 119

The present Application for Patent is a divisional of U.S. patent application Ser. No. 15/811,138 entitled "TECHNIQUES FOR RESERVATION PREAMBLE FOR LOW LATENCY DETECTION IN A NEW RADIO SHARED SPECTRUM COMMUNICATION SYSTEM" filed Nov. 13, 2017, which claims priority to U.S. Provisional Application No. 62/422,919 entitled "TECHNIQUES FOR RESERVATION PREAMBLE FOR LOW LATENCY DETECTION IN A NEW RADIO SHARED SPECTRUM COMMUNICATION SYSTEM" filed Nov. 16, 2016, which is assigned to the assignee hereof and hereby expressly incorporated by reference herein.

BACKGROUND

Aspects of this disclosure relate generally to wireless communication networks, and more particularly to techniques for a reservation preamble for low latency detection in a new radio shared spectrum wireless communication network.

Wireless communication networks are widely deployed to provide various telecommunication services such as telephony, video, data, messaging, and broadcasts. Typical wireless communication networks may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

As the number of packets being transmitted increases with 5G, techniques are needed to provide efficient and improved process when communicating frames during wireless communications. In certain instances, as the next generation of wireless communications come into existence, more flexible transmissions may be desired in order to ensure adequate or improved levels of wireless communications. Thus, improvements in communication during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method includes utilizing a reservation preamble for low latency detection by a user equipment (UE) in a new radio communication system. The described aspects include determining whether a first reservation preamble of a first operator is received on a first time slot of multiple time slots of a downlink channel from a first network entity. The described aspects further include transmitting a second reservation preamble of the first operator on an uplink channel to a second network entity based on a determination that the first reservation preamble of the first operator is received.

In an aspect, an apparatus for utilizing a reservation preamble for low latency detection by a UE in a new radio communication system may include a transceiver, a memory; and at least one processor coupled to the memory and configured to determine whether a first reservation preamble of a first operator is received on a first time slot of multiple time slots of a downlink channel from a first network entity. The described aspects further transmit a second reservation preamble of the first operator on an uplink channel to a second network entity based on a determination that the first reservation preamble of the first operator is received.

In an aspect, a computer-readable medium may store computer executable code for utilizing a reservation preamble for low latency detection by a UE in a new radio communication system is described. The described aspects include code for determining whether a first reservation preamble of a first operator is received on a first time slot of multiple time slots of a downlink channel from a first network entity. The described aspects further include code for transmitting a second reservation preamble of the first operator on an uplink channel to a second network entity based on a determination that the first reservation preamble of the first operator is received.

In an aspect, an apparatus for utilizing a reservation preamble for low latency detection by a UE in a new radio communication system is described. The described aspects include means for determining whether a first reservation preamble of a first operator is received on a first time slot of multiple time slots of a downlink channel from a first network entity. The described aspects further include means for transmitting a second reservation preamble of the first operator on an uplink channel to a second network entity based on a determination that the first reservation preamble of the first operator is received.

In accordance with an aspect, a method includes utilizing a reservation preamble for low latency detection by a network entity in a new radio communication system. The described aspects include generating a first reservation preamble of a first operator based on at least one of a compressed representation in a signal space, a basis function of the signal space, or a constant amplitude zero autocorrelation waveform (CAZAC) sequences. The described aspects further include transmitting, on a first timeslot of multiple time slots of a downlink channel, the first reservation preamble of the first operator to at least a UE.

In an aspect, an apparatus for utilizing a reservation preamble for low latency detection by a network entity in a new radio communication system may include a transceiver, a memory; and at least one processor coupled to the memory and configured to generate a first reservation preamble of a first operator based on at least one of a compressed representation in a signal space, a basis function of the signal space, or a CAZAC sequences. The described aspects further transmit, on a first timeslot of multiple time slots of a downlink channel, the first reservation preamble of the first operator to at least a UE.

In an aspect, a computer-readable medium may store computer executable code for utilizing a reservation preamble for low latency detection by a UE in a new radio communication system is described. The described aspects include code for generating a first reservation preamble of a first operator based on at least one of a compressed representation in a signal space, a basis function of the signal space, or a CAZAC sequences. The described aspects further include code transmitting, on a first timeslot of multiple time slots of a downlink channel, the first reservation preamble of the first operator to at least a UE.

In an aspect, an apparatus for utilizing a reservation preamble for low latency detection by a UE in a new radio communication system is described. The described aspects include means for generating a first reservation preamble of a first operator based on at least one of a compressed representation in a signal space, a basis function of the signal space, or a CAZAC sequences. The described aspects further include means for transmitting, on a first timeslot of multiple time slots of a downlink channel, the first reservation preamble of the first operator to at least a UE.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein.

DETAILED DESCRIPTION

Figure 1:
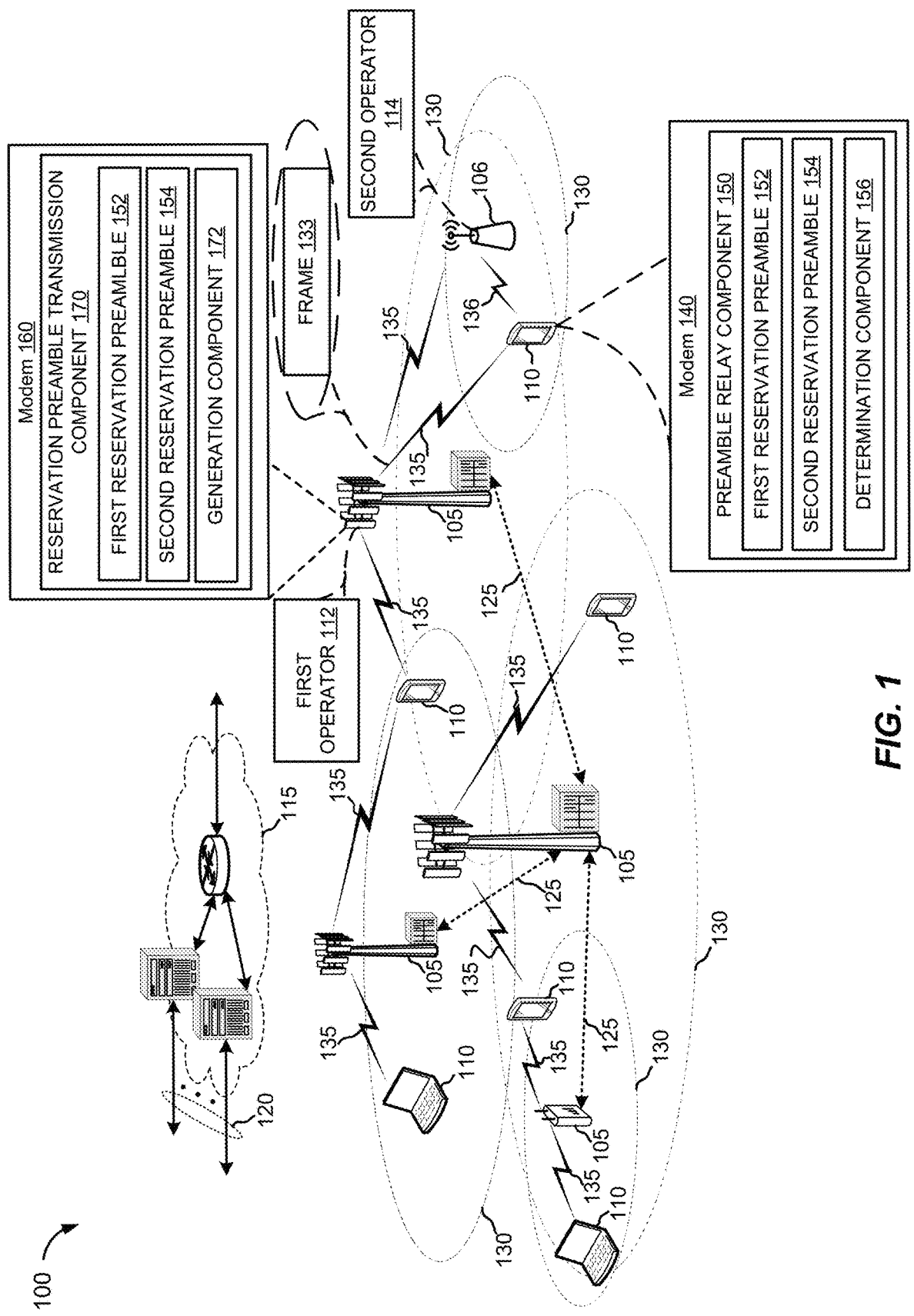
FIG. 1 is a schematic diagram of an example of a wireless communication network including at least one base station having a reservation preamble transmission component and at least one UE having a preamble relay component.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to a frame structure for new radio shared spectrum. Specifically, conventional implementations may be unsuited for facilitating communication between user equipments (UEs) and network entities supporting multiple operators. For example, an operator may be or otherwise correspond to a provider of wireless service. In particular, conventional implementations may either inefficiently utilize available spectrum associated with a particular radio access technology (RAT) across multiple operators, or may be unable to utilize available spectrum in conjunction with another operator. As such, a frame structure that allows for or otherwise facilitates multiple operator communication may be desirable. For instance, the frame structure may provide shared medium access by multiple operators in a new radio shared spectrum system.

Even more, medium access in various spectrums such as, but not limited to, an unlicensed spectrum, may utilize a listen-before-talk (LBT) scheme to monitor an unlicensed or shared channel so as to prevent or mitigate interference with another RAT and/or another operator. For instance, LBT may be performed via energy detection or preamble detection, which in some aspects, may utilize random backoff. However, performing LBT in an multi-RAT environment including various operators may encounter a number of drawbacks such as high overhead associated with random backoff, chances of collision if a continuous carrier aggregation (CCA) counter of at least two network entities reaches zero at the same CCA slot, issues associated with hidden network entities and spatial reuse. Accordingly, to overcome the above drawbacks, synchronization may be provided across various network entities (e.g., eNBs). In particular, to achieve such synchronization, the present aspects provide a priority-based medium contention scheme for one or more frequency bands that may or may not have an LBT scheme. For example, the scheme includes a reservation preamble associated with a particular operator may be transmitted by a network entity to notify one or more network entities (e.g., eNBs) of other operators that the network entity will occupy the medium or channel during a given transmission opportunity (e.g., during a time duration of a number of symbols). In some instances, certain network entities may have higher assigned priorities than other network entities.

Accordingly, in some aspects, the present methods and apparatuses may provide an efficient solution, as compared to conventional solutions, by utilizing reservation preambles associated with a distinct operator for announcing to other operators a reservation of at least one transmission opportunity of a given frame in a new radio shared spectrum. In other words, in the present aspects, a UE may efficiently and effectively determine whether a first reservation preamble of a first operator is received on a first time slot of multiple time slots of a downlink channel from a first network entity, and transmit a second reservation preamble of the first operator on an uplink channel to the second network entity based on a determination that the first reservation preamble of the first operator is received. Further, the present aspects provide one or more mechanisms for a first network entity to generate a first reservation preamble of a first operator based on at least one of a compressed representation in a signal space, a basis function of the signal space, or a constant amplitude zero autocorrelation waveform (CAZAC) sequences, and transmit, on a first timeslot of multiple time slots of a downlink channel, the first reservation preamble of the first operator to at least a UE.

Additional features of the present aspects are described in more detail below with respect to FIGS. 1-12.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in accordance with various aspects of the present disclosure, an example wireless communication network 100 includes at least one UE 110 with a modem 140 having a preamble relay component 150 that may be configured to facilitate reception of a reservation preamble according to a new radio shared spectrum frame structure on one or more downlink communication channels from a network entity such as base station 105 in a wireless communication network 100. Further, the at least one base station 105 includes a modem 160 having a reservation preamble transmission component 170 that transmit, via communication channel 135, a reservation preamble of a particular operator based on an indication that the particular operator will transmit data on at least one transmission opportunity of a frame 133. For example, the preamble relay component 150 may receive, on a downlink channel from a first network entity (e.g., base station 105), a first reservation preamble 152 of a first operator 112, and transmit, on an uplink channel (e.g., communication channel 136), the second reservation preamble 154 of the first operator 112 to the second network entity (e.g. base station 106). Further, the reservation preamble transmission component 170 may generate a first reservation preamble 152 of a first operator 112 based on at least one of a compressed representation in a signal space, a basis function of the signal space, or a constant amplitude zero autocorrelation waveform (CAZAC) sequences.

Figure 5:
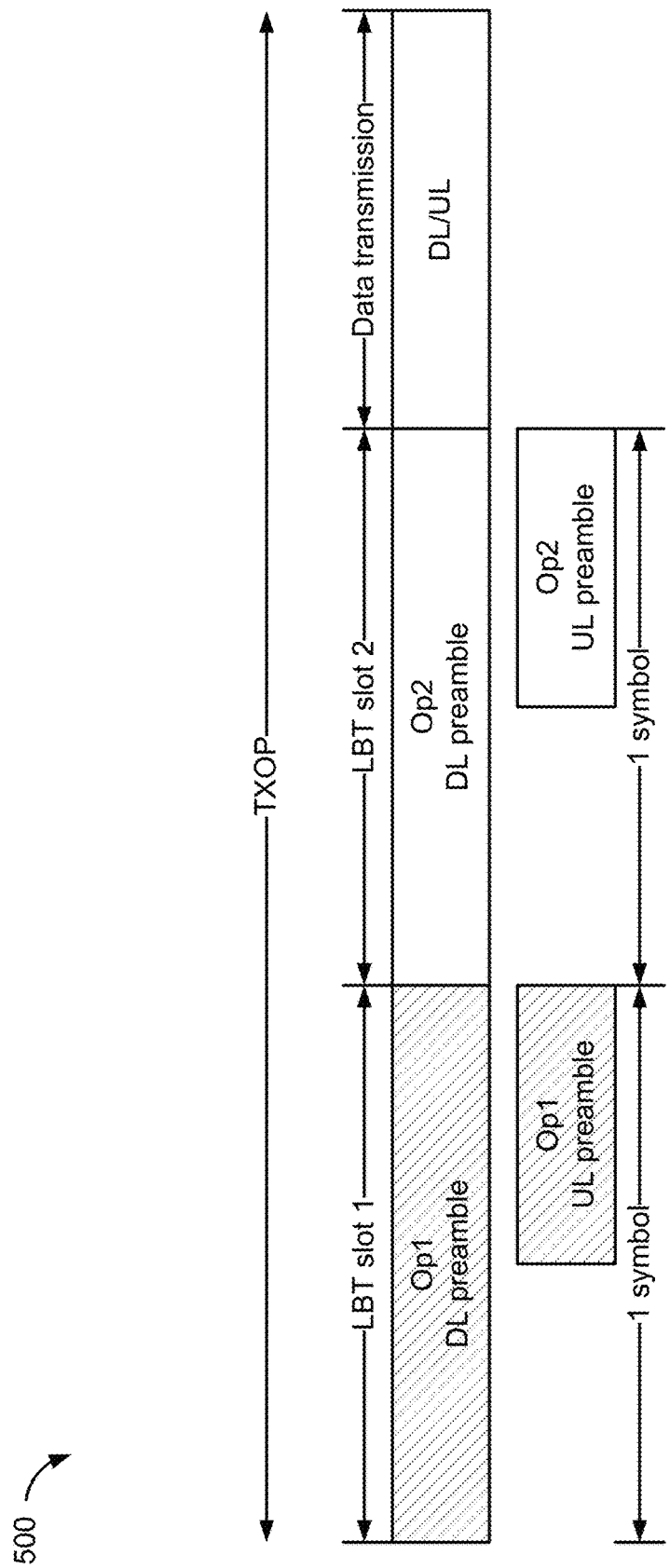
FIG. 5 is a conceptual diagram of an example of a transmission opportunity in accordance with one or more aspects of the disclosure.

In an aspect, the UE 110 may include the preamble relay component 150, which may be configured to facilitate reception of a reservation preamble according to a new radio shared spectrum frame structure on one or more downlink communication channels from a network entity such as base station 105. For example, with reference to FIG. 5, a reservation preamble associated with a particular operator (e.g., first operator 112) may inform or otherwise indicate to one or more network entities (e.g., base station 106) associated with different operators that the base station 105 will transmit data on a transmission opportunity (e.g., formed of a number of subframes of a consistent time duration). However, in some cases, network entities (e.g., base station 106) may be hidden from or remain undetected by the transmitting network entity, i.e. base station 105, and as such, the reservation preamble may not be received by the potentially interfering network entity (e.g., base station 106). As such, UE 110 may transmit the reservation preamble to the one or more network entities (e.g., base station 106) that may potentially interfere with the transmission of the transmission opportunity associated with the reservation preamble by the network entity. In some aspects, UE 110 may transmit one or more transmission opportunities within a frame 133 in accordance with a frame structure that facilities transmission on subframes or symbols associated with multiple or different operators, as illustrated in FIG. 5.

Specifically, to facilitate network synchronization, preamble relay component 150 may be configured to determine whether a first reservation preamble 152 of a first operator 112 is received on a first time slot of multiple time slots of a downlink channel 135 from a first base station 105 (e.g., which may be a serving eNB). For example, determination component 156 may determine whether a first reservation preamble 152 of a first operator 112 is received by partitioning a receiver timeframe into multiple segments each with a maximum time duration, accumulating one or more of the multiple segments corresponding to a portion of the first reservation preamble 152, applying a non-coherent cross-correlation operation to each of the accumulated one or more segments, and combining each output of the non-coherent cross-correlation operations to trigger detection of the first reservation preamble 152. In some aspects, the non-coherent cross-correlation operation corresponds to at least one of a time-domain non-coherent cross-correlation operation or a frequency-domain non-coherent cross-correlation operation.

In some aspects, UE 110 and/or preamble relay component 150 may be configured to determine a ratio of a time duration of the second reservation preamble 154 and a time duration of a switching gap. In some examples, the second reservation preamble 154 is aligned with a slot boundary of the first time slot. In an example, a sequence of the second reservation preamble 154 corresponds to at least one of a punctured or a phase rotated waveform of the first reservation preamble 152.

In an aspect, UE 110 and/or preamble relay component 150 may execute transceiver 60 to transmit a second reservation preamble 154 of the first operator 112 on an uplink channel 136 to the second base station 106 based on a determination that the first reservation preamble 152 of the first operator 112 is received. In an example, transceiver 502 may transmit the second reservation preamble 154 at a transmission time corresponding to a time of completion of the determination that the first reservation preamble 152 of the first operator 112 is received. In some examples, an end time of the second reservation preamble 154 corresponds to an end time of the first reservation preamble 152, the end time of the second reservation preamble 154 and the end time of the first reservation preamble 152 being aligned with a slot boundary of the first time slot.

In some aspects, UE 110 and/or preamble relay component 150 may execute transceiver 502 to transmit the second reservation preamble 154 as a single frequency network (SFN) transmission based on the UE 110 and the first base station 105 both corresponding to the first operator 112.

In some aspects, the UE 110 includes a plurality of transmit antennas 64-a to 64-b. Further, UE 110 and/or preamble relay component 150 may execute transceiver 502 to transmit, on the plurality of transmit antennas 64-a to 64-b, the second reservation preamble 154 by reusing an OFDM frame. Additionally, UE 110 and/or preamble relay component 150 may execute transceiver 502 to transmit the second reservation preamble 154 based on a configurable transmit diversity scheme. For example, the configurable transmit diversity scheme includes at least one of a tone interleaving in a frequency domain, sub-band interleaving in the frequency domain, or a cyclic shift diversity in a time domain.

Further, the UE 110, and in particular preamble relay component 150 may configure the frame structure of frame 133 based on frame configuration information received from the base station 105. For example, preamble relay component 150 may be configured to receive an indication including a number of operators from the base station 105, and determine a transmission opportunity structure including at least one uplink timeslot based on the number of operators from the base station 105. Accordingly, preamble relay component 150 may be configured to transmit the second reservation preamble 154 of the first operator 112 to the second network entity during the at least one uplink listen-before-talk timeslot. Further, UE 110, and in particular preamble relay component 150 may be configured to receive at least one of a duration or a priority of one or more transmission opportunities, and forgo monitoring of one or more timeslots.

In an aspect, the base station 105 and/or reservation preamble transmission component 170 may execute transceiver 602 to transmit, on a first timeslot of multiple time slots of a downlink channel 135, the first reservation preamble 152 of the first operator to at least a UE 110. For example, transceiver 602 may transmit a plurality of uniformly spaced pilot tones corresponding to the first reservation preamble 152. For example, base station 105 and/or reservation preamble transmission component 170 may execute transceiver 602 to transmit the first reservation preamble 152 as a single frequency network (SFN) transmission based on the UE 110 and the first base station 105 both corresponding to the first operator 112. In another example, transceiver 602 may transmit data associated with the first operator 112 within a portion of a transmission opportunity on the downlink channel 135 in response to transmitting the first reservation preamble 152 of the first operator 112. In some examples, the first reservation preamble 152 of the first operator 112 notifies the UEs served by the first base station 105 and at least one of a second base station 106 that the first base station 105 will access a channel 135 during the portion of the transmission opportunity. In other examples, the reservation preamble 152 may restrict access of one or more network entities including at least one of a second base station 106 to the portion of the transmission opportunity based on a determination that the first reservation preamble 152 of the first operator 112 has been transmitted by at least the first base station 105.

In some aspects, the first network entity includes a plurality of transmit antennas 665. Further, base station 105 and/or reservation preamble transmission component 170 may execute transceiver 602 to transmit, on the plurality of transmit antennas 665, the first reservation preamble 152 by reusing an OFDM frame. Additionally, base station 105 and/or reservation preamble transmission component 170 may execute transceiver 602 to transmit the first reservation preamble 152 based on a configurable transmit diversity scheme. In an example, the configurable transmit diversity scheme includes at least one of a tone interleaving in a frequency domain, a sub-band interleaving in the frequency domain, or a cyclic shift diversity in a time domain.

In an aspect, the base station 106 and/or reservation preamble transmission component 170 may execute transceiver 602 to receive, on the first timeslot of an uplink channel from the UE 110, a second reservation preamble 154 of the first operator 112 in addition to receiving, on the first timeslot of the downlink channel 135, the first reservation preamble 152 of the first operator 112 to at least the UE 110. For example, a sequence of the second reservation preamble 154 corresponds to at least one of a punctured or a phase rotated waveform of the first reservation preamble 152.

In an aspect, the base station 105 may include the reservation preamble transmission component 170, which may be configured to transmit a reservation preamble of a particular operator based on an indication that the particular operator will transmit data on at least one transmission opportunity of a frame 133. That is, reservation preamble transmission component 170 may notify or inform other network entities (e.g., second base station 106) supporting various operators that may potentially interfere with transmission of transmission opportunities by the first base station 105. In some aspects, the first reservation preamble 152 and the second operator reservation preamble 154 may notify one or more network entities including the base station 106 (e.g., non-serving eNB) that the base station 105 will transmit data on a channel during the portion of the transmission opportunity for a given operator.

Specifically, the reservation preamble transmission component 170 may be configured to control operator access to one or more transmission opportunities by determining whether a highest priority operator has elected not to transmit a corresponding reservation preamble. For example, in some aspects, the first operator 112 may have a highest priority level such that access to at least one transmission opportunity may be made without contention with other operators. If the first operator 112 elects to transmit data on the at least one transmission opportunity, reservation preamble transmission component 170 may be configured to notify or inform other network entities (e.g., base station 106) supporting different operators that base station 105 plans on or will transmit data of the first operator 112 at the at least one transmission opportunity (e.g., so as to avoid or mitigate interference with the other network entities transmitting on the same frequencies).

In the event the first operator 112 foregoes the opportunity to transmit on the at least one transmission opportunity of the frame 133, reservation preamble transmission component 170, and more specifically determination component 172, may be configured to determine whether a second operator 114 has elected to transmit data on the at least one transmission opportunity upon determining that the first operator 112 has not transmitted the first operator reservation preamble 152. As such, reservation preamble transmission component 170 may be configured to transmit a second operator reservation preamble 154 to a distinct network entity of at least the first operator 112, for example, based on a determination that the reservation preamble of the first operator 112 has not been transmitted to at least the second base station 106.

Further, where first base station 105 supports a third operator, reservation preamble transmission component 170 may make a similar determination to determine whether the third operator may transmit an associated reservation preamble for access to the transmission opportunity. That is, when both the first operator 112 and the second operator 114 have determined or elected not to utilize the transmission opportunity, and correspondingly where the third operator does not detect transmission of neither first operator reservation preamble 152 nor second operator reservation preamble 154, the third operator may or may not transmit an associated reservation preamble via reservation preamble transmission component 170.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105/106 may wirelessly communicate with the UEs 110 via one or more base station antennas. Each of the base stations 105/106 may provide communication coverage for a respective geographic coverage area 130. In some examples, base stations 105/106 may be referred to as a base transceiver station, a radio base station, an access point, an access node, a radio transceiver, a NodeB, eNodeB (eNB), gNodeB (gNB), Home NodeB, a Home eNodeB, a relay, or some other suitable terminology. The geographic coverage area 130 for a base station 105/106 may be divided into sectors or cells making up only a portion of the coverage area (not shown). The wireless communication network 100 may include base stations 105/106 of different types (e.g., macro base stations or small cell base stations, described below). Additionally, the plurality of base stations 105/106 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a new radio (NR) or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105/106, while the term UE may be generally used to describe the UEs 110. The wireless communication network 100 may be a heterogeneous technology network in which different types of eNBs provide coverage for various geographical regions. For example, each eNB or base station 105/106 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by the UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by the UEs 110 with service subscriptions with the network provider. A femto cell may also cover a small geographic area (e.g., a home) and may provide restricted access and/or unrestricted access by the UEs 110 having an association with the femto cell (e.g., in the restricted access case, the UEs 110 in a closed subscriber group (CSG) of the base station 105, which may include the UEs 110 for users in the home, and the like). A micro cell may cover a geographic area larger than a pico cell and a femto cell, but smaller than a macro cell. An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, the RRC protocol layer may provide establishment, configuration, and maintenance of an RRC connection between a UE 110 and the base station 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links for channel reservation 135 shown in wireless communication network 100 may carry uplink (UL) transmissions from a UE 110 to a base station 105, or downlink (DL) transmissions, from a base station 105 to a UE 110. The downlink transmissions may also be called forward link transmissions while the uplink transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

Similarly, in an aspect, UE 110 may be configured to establish one or more wireless communication links 136 with one or more base stations 106. The wireless communication links for channel reservation 136 shown in wireless communication network 100 may carry UL transmissions from a UE 110 to a base station 106, or DL transmissions from a base station 106 to a UE 110. For example, these UL transmissions may correspond to a communication link from UEs 110 served by the first network entity (e.g. the base station 105) to the potential aggressor of the second network entity (e.g. the base station 106).

In some aspects of the wireless communication network 100, base stations 105/106 or UEs 110 may include multiple antennas for employing antenna diversity schemes to improve communication quality and reliability between base stations 105 and UEs 110. Additionally or alternatively, base stations 105/106 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple downlink CCs and one or more uplink CCs for carrier aggregation. Carrier aggregation may be used with both FDD and TDD component carriers. The base stations 105 and UEs 110 may use spectrum up to Y MHz (e.g., Y=5, 10, 15, or 20 MHz) bandwidth per carrier allocated in a carrier aggregation of up to a total of Yx MHz (x=number of component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications network 100 may further include base stations 105/106 operating according to Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
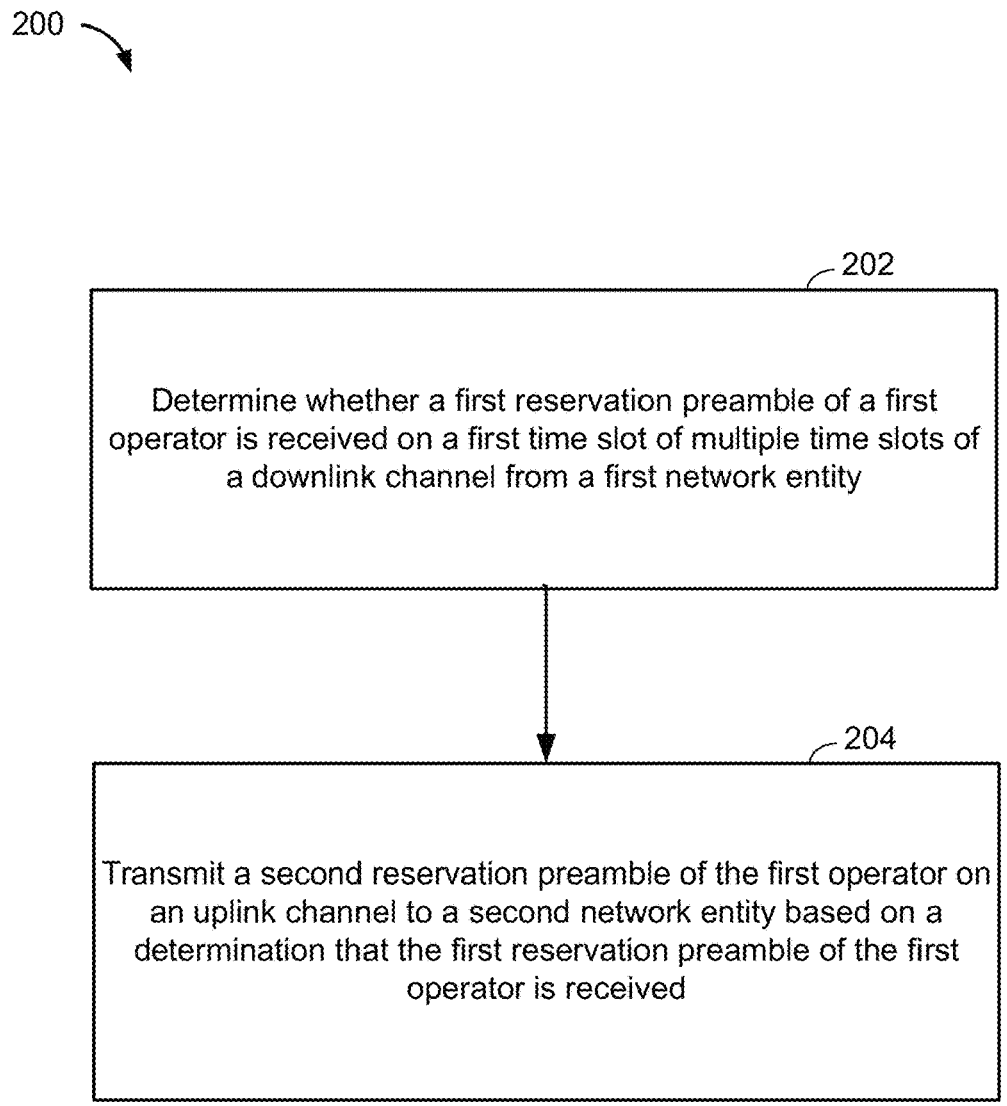
FIG. 2 is a flow diagram illustrating an example of a method of communications in a wireless communication system in accordance with one or more aspects of the disclosure.

FIG. 2 is a flow diagram illustrating examples of a method 200 related to detection of at least one reservation preamble in accordance with various aspects of the present disclosure. Although the operations described below are presented in a particular order and/or as being performed by an example component, it should be understood that the ordering of the actions and the components performing the actions may be varied, depending on the implementation. Also, although the preamble relay component 150 is illustrated as having a number of subcomponents, it should be understood that one or more of the illustrated subcomponents may be separate from, but in communication with, the preamble relay component 150, and/or each other. Moreover, it should be understood that any of actions or components described below with respect to the preamble relay component 150 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

In an aspect, at block 202, the method 200 may determine whether a first reservation preamble of a first operator is received on a first time slot of multiple time slots of a downlink channel from a first network entity. In an aspect, for example, the UE 110 and/or preamble relay component 150 may execute the determination component 156 to determine whether a first reservation preamble 152 of a first operator 112 is received on a first time slot of multiple time slots of a downlink channel 135 from a first base station 105.

In some aspects, determination component 156 may determine whether a first reservation preamble 152 of a first operator 112 is received by partitioning a receiver timeframe into multiple segments each with a maximum time duration, accumulating one or more of the multiple segments corresponding to a portion of the first reservation preamble 152, applying a non-coherent cross-correlation operation to each of the accumulated one or more segments, and combining each output of the non-coherent cross-correlation operations to trigger detection of the first reservation preamble 152.

In some aspects, the non-coherent cross-correlation operation corresponds to at least one of a time-domain non-coherent cross-correlation operation or a frequency-domain non-coherent cross-correlation operation.

At block 204, the method 200 may transmit a second reservation preamble of the first operator on an uplink channel to a second network entity based on a determination that the first reservation preamble of the first operator is received. In an aspect, for example, the UE 110 and/or preamble relay component 150 may execute transceiver 502 to transmit a second reservation preamble 154 of the first operator 112 on an uplink channel to a second base station 106 based on a determination that the first reservation preamble 152 of the first operator 112 is received.

In some aspects, UE 110 and/or preamble relay component 150 may execute transceiver 60 (FIG. 1) to transmit the second reservation preamble 154 at a transmission time corresponding to a time of completion of the determination that the first reservation preamble 152 of the first operator 112 is received.

In some aspects, an end time of the second reservation preamble 154 corresponds to an end time of the first reservation preamble 152, the end time of the second reservation preamble 154 and the end time of the first reservation preamble 152 being aligned with a slot boundary of the first time slot.

In some aspects, although not shown, method 300 may include determining a ratio of a time duration of the second reservation preamble 154 and a time duration of a switching gap, wherein the second reservation preamble 154 is aligned with a slot boundary of the first time slot.

In some aspects, a sequence of the second reservation preamble 154 corresponds to at least one of a punctured or a phase rotated waveform of the first reservation preamble 152.

In some aspects, UE 110 and/or preamble relay component 150 may execute transceiver 502 to transmit the second reservation preamble 154 as a single frequency network (SFN) transmission based on the UE 110 and the first base station 105 both corresponding to the first operator 112.

In some aspects, the UE 110 includes a plurality of transmit antennas 656. Further, UE 110 and/or preamble relay component 150 may execute transceiver 502 to transmit, on the plurality of transmit antennas 565, the second reservation preamble 154 by reusing an OFDM frame.

In some aspects, UE 110 and/or preamble relay component 150 may execute transceiver 502 to transmit the second reservation preamble 154 based on a configurable transmit diversity scheme.

In some aspects, the configurable transmit diversity scheme includes at least one of a tone interleaving in a frequency domain, sub-band interleaving in the frequency domain, or a cyclic shift diversity in a time domain.

In some aspects, although not shown, method 200 may include receiving an indication including a number of operators from the first base station 105, and determining a transmission opportunity structure including the first timeslot based on the number of operators from the first base station 105, wherein the number of operators includes a second base station 106 with a priority level less than the first base station 105.

Figure 3:
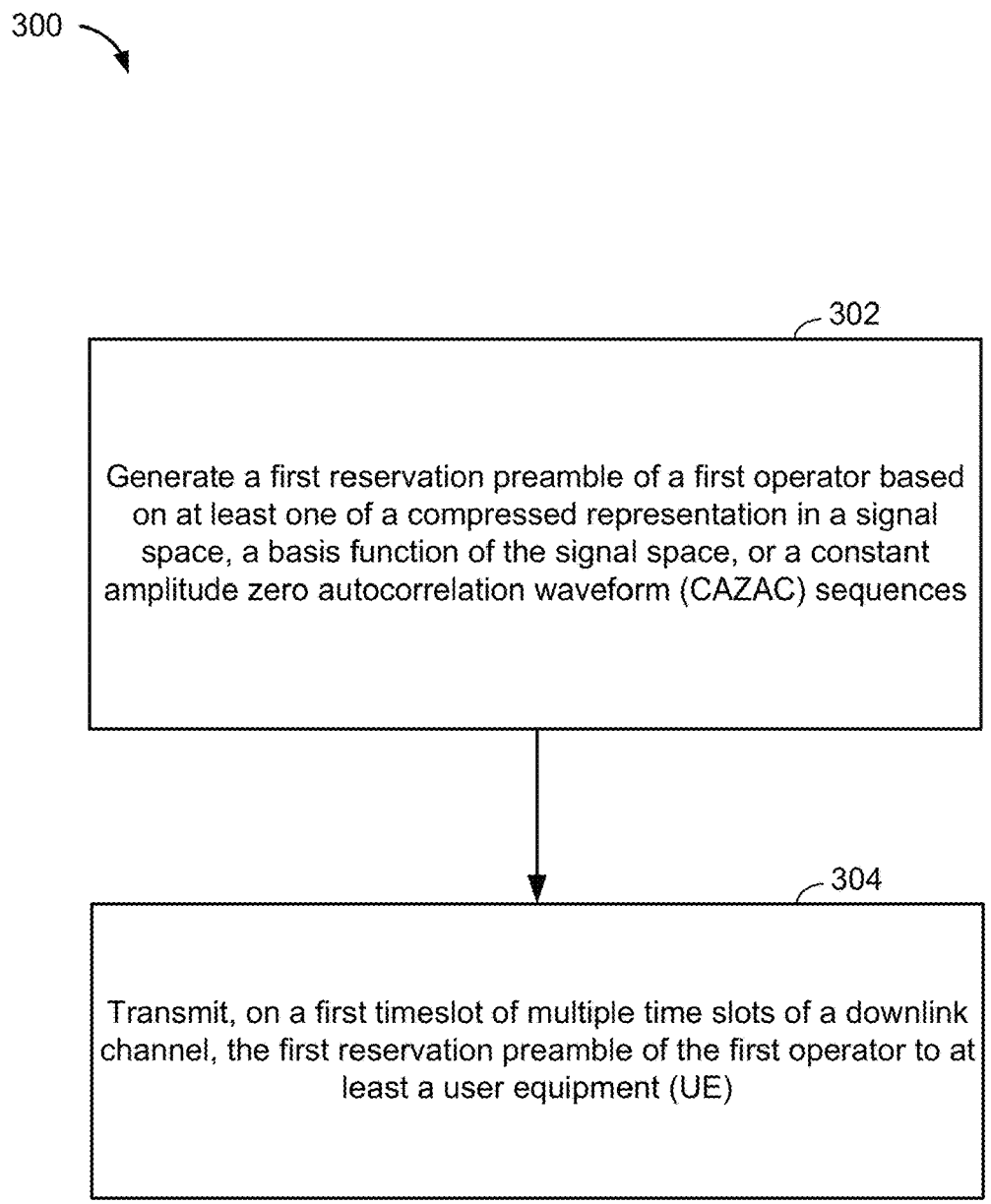
FIG. 3 is a flow diagram illustrating an example of a method of wireless communications at a network entity in accordance with one or more aspects of the disclosure.

FIG. 3 is a flow diagram illustrating examples of a method 300 related to transmission of at least one reservation preamble in accordance with various aspects of the present disclosure. Although the operations described below are presented in a particular order and/or as being performed by an example component, it should be understood that the ordering of the actions and the components performing the actions may be varied, depending on the implementation. Also, although the reservation preamble transmission component 170 is illustrated as having a number of subcomponents, it should be understood that one or more of the illustrated subcomponents may be separate from, but in communication with, the reservation preamble transmission component 170, and/or each other. Moreover, it should be understood that any of actions or components described below with respect to the reservation preamble transmission component 170 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

In an aspect, at block 302, the method 300 may generate a first reservation preamble of a first operator based on at least one of a compressed representation in a signal space, a basis function of the signal space, or a CAZAC sequences. In an aspect, for example, the base station 105 and/or reservation preamble transmission component 170 may execute the determination component 172 to generate a first reservation preamble 152 of a first operator 112 based on at least one of a compressed representation in a signal space, a basis function of the signal space, or a CAZAC sequences.

At block 304, the method 300 may transmit, on a first timeslot of multiple time slots of a downlink channel, the first reservation preamble of the first operator to at least a UE. In an aspect, for example, the base station 105 and/or reservation preamble transmission component 170 may execute transceiver 602 to transmit, on a first timeslot of multiple time slots of a downlink channel 135, the first reservation preamble 152 of the first operator to at least a UE 110.

In some aspects, base station 105 and/or reservation preamble transmission component 170 may execute transceiver 602 to transmit a plurality of uniformly spaced pilot tones corresponding to the first reservation preamble 152.

In some aspects, the first network entity includes a plurality of transmit antennas 665. Further, base station 105 and/or reservation preamble transmission component 170 may execute transceiver 602 to transmit, on the plurality of transmit antennas 665, the first reservation preamble 152 by reusing an OFDM frame.

In some aspects, network entity includes a plurality of transmit antennas. Further, base station 105 and/or reservation preamble transmission component 170 may execute transceiver 602 to transmit the first reservation preamble 152 based on a configurable transmit diversity scheme.

In some aspects, the configurable transmit diversity scheme includes at least one of a tone interleaving in a frequency domain, a sub-band interleaving in the frequency domain, or a cyclic shift diversity in a time domain.

In some aspects, although not shown, method 300 may include transmitting, on the first timeslot of an uplink channel from the UE 110, a second reservation preamble 154 of the first operator 112 in response to receiving, on the first timeslot of the downlink channel 135, the first reservation preamble 152 of the first operator 112 to at least the UE 110.

In some aspects, a sequence of the second reservation preamble 154 corresponds to a sequence of the first reservation preamble 152.

In some aspects, base station 105 and/or reservation preamble transmission component 170 may execute transceiver 602 to transmit the first reservation preamble 152 as a single frequency transmission based on the UE 110 and the first base station 105 both corresponding to the first operator 112.

In some aspects, base station 105 and/or reservation preamble transmission component 170 may execute transceiver 602 to transmit data associated with the first operator 112 within a portion of a transmission opportunity on the downlink channel 135 in response to transmitting the first reservation preamble 152 of the first operator 112.

In some aspects, the first reservation preamble 152 of the first operator 112 notifies the first base station 105 and at least one of a second base station 106 that the first base station 105 will access a channel 135 during the portion of the transmission opportunity.

In some aspects, although not shown, method 300 may include restricting access of one or more network entities including at least one of a second base station 106 to the portion of the transmission opportunity based on a determination that the first reservation preamble 152 of the first operator 112 has been transmitted by at least the first base station 105.

Figure 4:
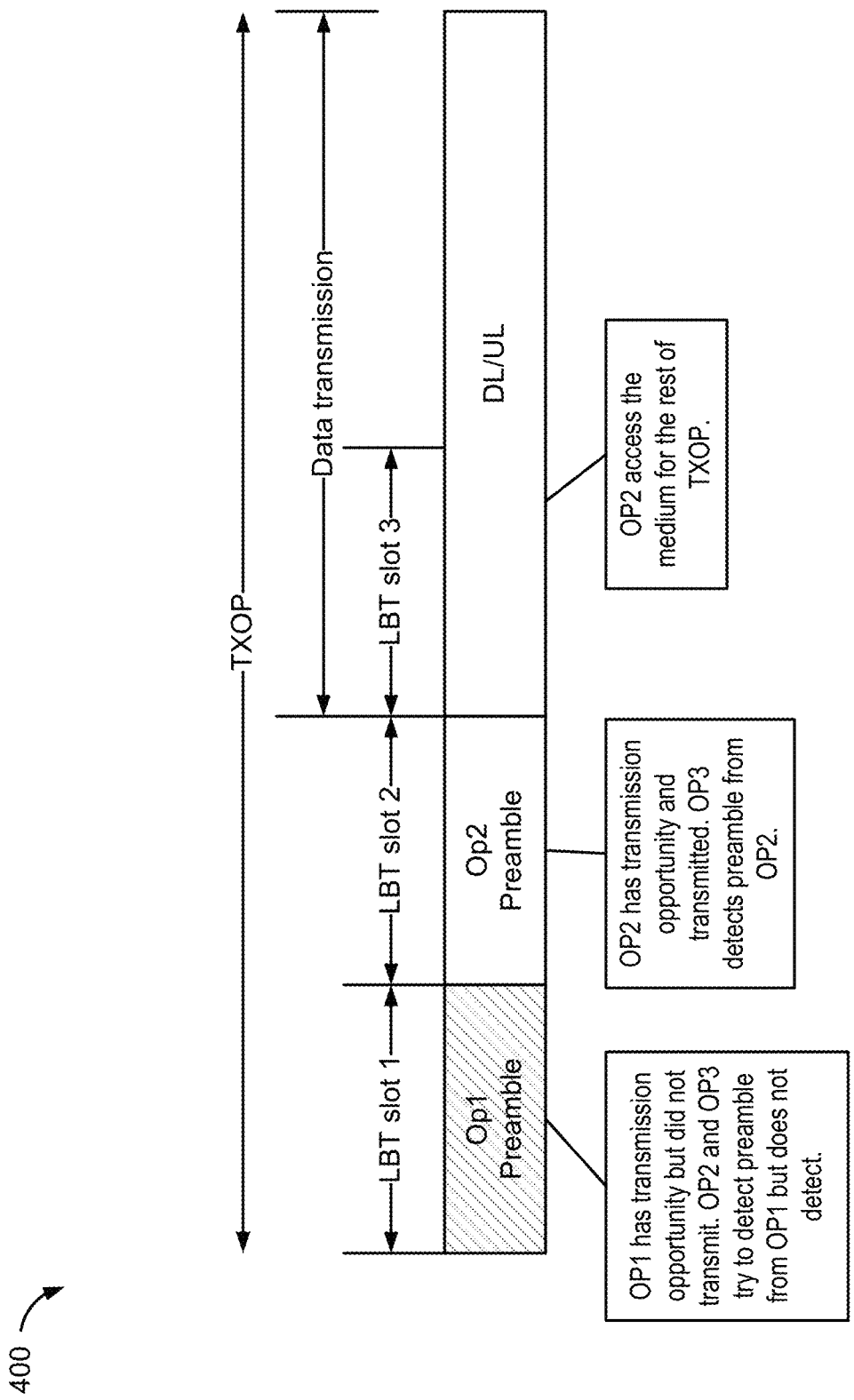
FIG. 4 is a conceptual diagram of an example of a transmission opportunity in accordance with one or more aspects of the disclosure.

FIG. 4 is a conceptual diagram of a transmission opportunity 400 including a reservation preamble structure during downlink communications from a network entity, such as base station 105, to a UE, such as UE 110, in accordance with one or more aspects. For example, transmission opportunity 400 including a reservation preamble structure may be part of frame 133 in an communication system supporting at least three operators (e.g., OP1, OP2, and OP3). In some aspects, transmission opportunity 400 may include one or more LBT slots allowing for or facilitating transmission of a reservation preamble of a particular operator assigned to an LBT slot based on a priority level. For example, the first operator 112 may have the highest priority and as such, may determine or elect to transmit data on the transmission opportunity 400 without contention from other operators. The second operator 114 may transmit on the transmission opportunity if the first operator 112 elects not to transmit the assigned or allocated reservation preamble to the other network entities. Likewise, a third operator may transmit utilize the transmission opportunity 400 and transmit the assigned or allocated reservation preamble when the first operator 112 and second operator 114 forego transmission of their respective reservation preambles.

FIG. 5 is a conceptual diagram of a transmission opportunity 500 including a reservation preamble structure during downlink communications from a network entity, such as base station 105, to a UE, such as UE 110, in accordance with one or more aspects. For example, transmission opportunity 400 including a reservation preamble structure may be part of frame 133 in an communication system supporting at least two operators (e.g., OP1 and OP2). In some aspects, transmission opportunity 500 may include one or more LBT slots allowing for or facilitating transmission of a reservation preamble of a particular operator assigned to an LBT slot based on a priority level. For example, transmission opportunity 500 permits the downlink and uplink reservation preamble relaying scheme according to frequency division duplexing. In particular, a node, such as a UE, may detect a reservation preamble in LBT slot 2. Through the process of early detection (e.g., low latency) of the reservation preamble, the node may transmit a corresponding reservation preamble on the uplink before the end of the LBT slot 2. As such, OP1 may reserve the channel for uplink and downlink communications.

Figure 6:
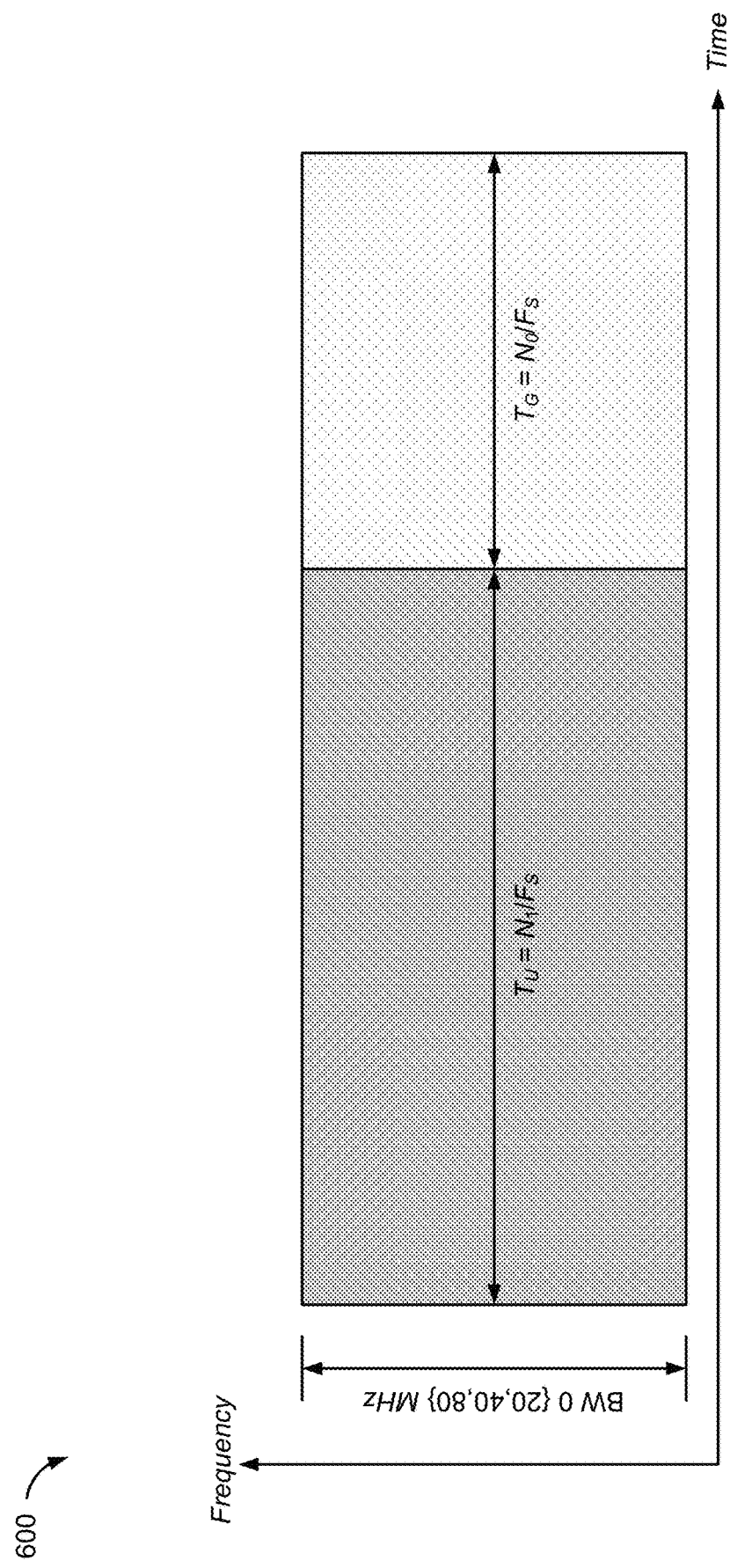
FIG. 6 is a conceptual diagram of an example of a reservation preamble with a configurable switching gap in accordance with one or more aspects of the disclosure.

FIG. 6 is a conceptual diagram of an example of a reservation preamble 600 with a configurable switching gap in accordance with one or more aspects. For instance, the reservation preamble transmission of the first operator 112 may be part of frame 133 in an communication system supporting at least three operators. The reservation preamble 600 may include a system bandwidth of at least one of 20, 40, or 80 MHz. Further, the time duration of the reservation preamble 600 may be the summation of $T_U$ and $T_G$, where $T_U$ corresponds to the waveform samples of a multi-tone transmission, and $T_G$ corresponds to the switching gap without active transmissions. In some instances, for the same operator, the downlink and uplink reservation preambles use the same sequence to achieve the single frequency network effect, which would enhance the reliability of channel reservations at the operator-level. Additionally, the ratio of the switching gap to the multi-tone transmission (e.g., $N_0/N_1$) may be adaptive to different coverage requirements of the downlink and uplink channel reservations.

Figure 7:
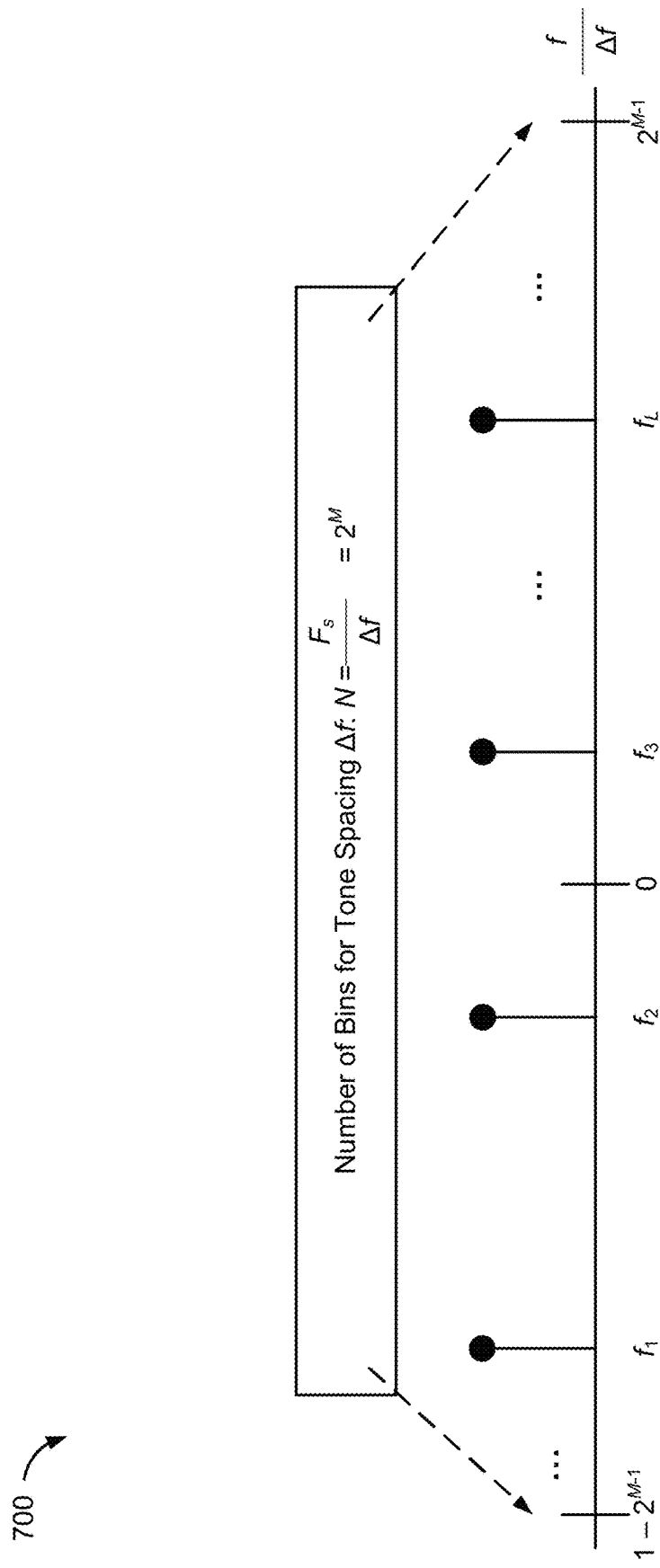
FIG. 7 is a conceptual diagram of an example of a scenario for frequency mapping of reservation preamble tones in accordance with one or more aspects of the disclosure.

FIG. 7 is a conceptual diagram of an example of a scenario 700 of frequency mapping of reservation preamble tones in accordance with one or more aspects. For example, a network entity, such as base station 105, may generate a reservation preamble that enables early detection (e.g., low latency) by using less than $N_1$ samples at a sample rate $F_s$ with L tones of the reservation preamble needing to be allocated to L bins of a reduced-sized fast Fourier transform (FFT) of size $2^{m-Q}$. As a result, once the reservation preamble is transmitted on the downlink, a node, such as a UE 110, may perform early detection of the reservation preamble based on the frequency mapping of the preamble tones.

Figure 8:
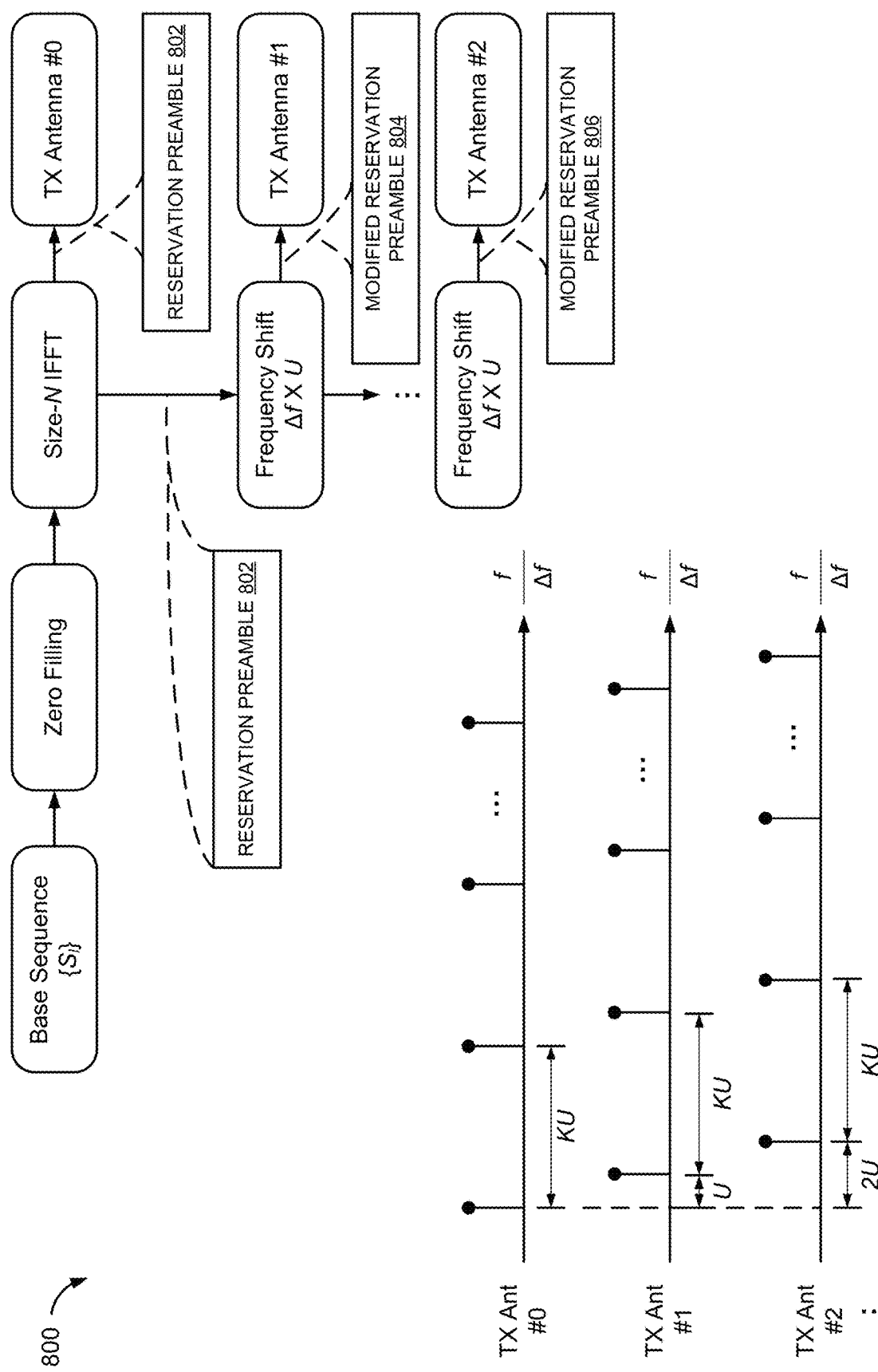
FIG. 8 is a conceptual diagram of an example of a transmission scenario in accordance with one or more aspects of the disclosure.

FIG. 8 is a conceptual diagram of an example of a transmission scheme scenario 800 for a reservation preamble in accordance with one or more aspects. For instance, the reservation preamble transmission of the first operator 112 may be part of frame 133 in an communication system supporting tone interleaving. In some aspects, the reservation preamble 802 may be transmitted using a plurality of antennas. For example, the reservation preamble 802 may be generated using a base sequence and zero filling with a size-N inverse FFT (IFFT). After generation, the reservation preamble 802 may be transmitted by transmit antenna 0. Additionally, a modified reservation preamble 804 may be transmitted by transmit antenna 1 with a frequency shift of size U, and a modified reservation preamble 806 may be transmitted by transmit antenna 2 with a frequency shift of 2U.

Figure 9:
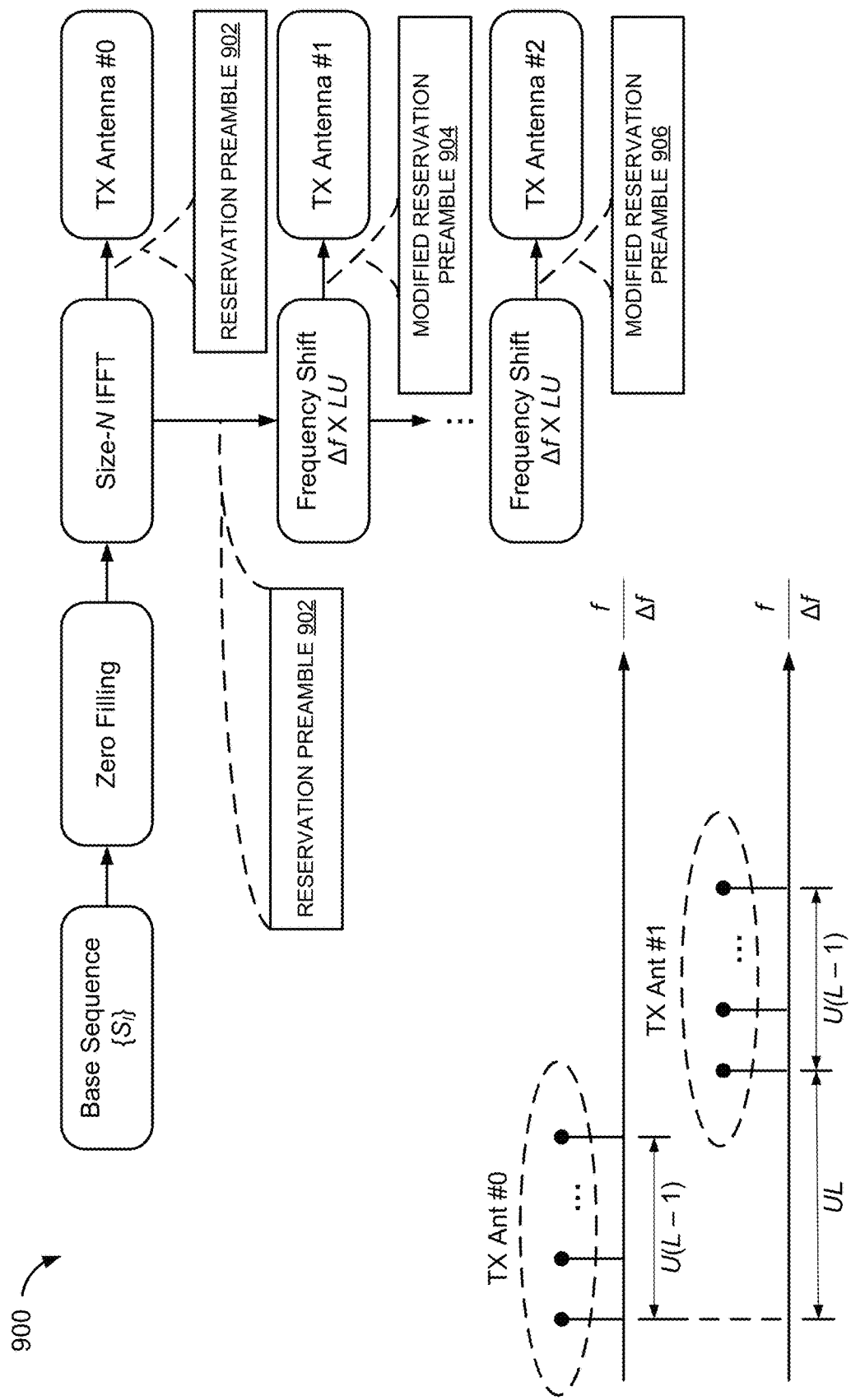
FIG. 9 is a conceptual diagram of an example of a transmission scenario in accordance with another aspect of the disclosure.

FIG. 9 is a conceptual diagram of an example of a transmission scheme scenario 900 for a reservation preamble in accordance with one or more aspects. For example, the reservation preamble transmission of the first operator 112 may be part of frame 133 in an communication system supporting sub-band interleaving. Similar to FIG. 8, the reservation preamble 902 may be transmitted using a plurality of antennas. For example, the reservation preamble 902 may be generated using a base sequence and zero filling with a size-N IFFT. After generation, the reservation preamble 902 may be transmitted by transmit antenna 0. Additionally, a modified reservation preamble 904 may be transmitted by transmit antenna 1 with a frequency shift of size L, and a modified reservation preamble 906 may be transmitted by transmit antenna 2 with a frequency shift of 2L.

Figure 10:
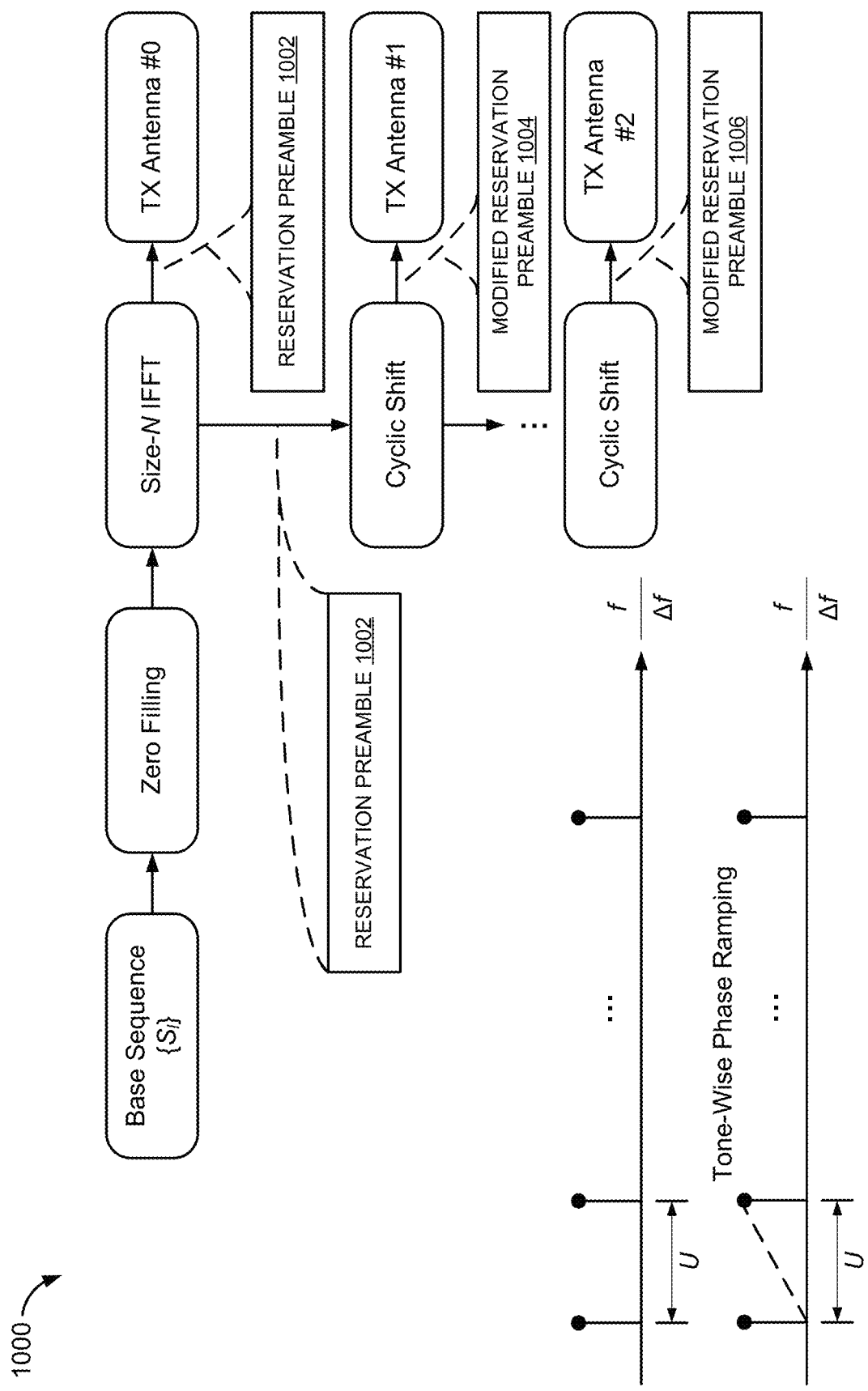
FIG. 10 is a conceptual diagram of an example of a transmission scenario in accordance with one or more aspects of the disclosure.

FIG. 10 is a conceptual diagram of an example of a transmission scheme scenario 1000 for a reservation preamble in accordance with one or more aspects. For example, the reservation preamble transmission of the first operator 112 may be part of frame 133 in an communication system supporting cyclic shift diversity. Similar to FIG. 8, the reservation preamble 1002 may be transmitted using a plurality of antennas. For example, the reservation preamble 1002 may be generated using a base sequence and zero filling with a size-N IFFT. After generation, the reservation preamble 1002 may be transmitted by transmit antenna 0. Additionally, a modified reservation preamble 1004 may be transmitted by transmit antenna 1 with a cyclic shift (e.g., tone-wise phase ramping), and a modified reservation preamble 1006 may be transmitted by transmit antenna 2 with a cyclic shift.

Figure 11:
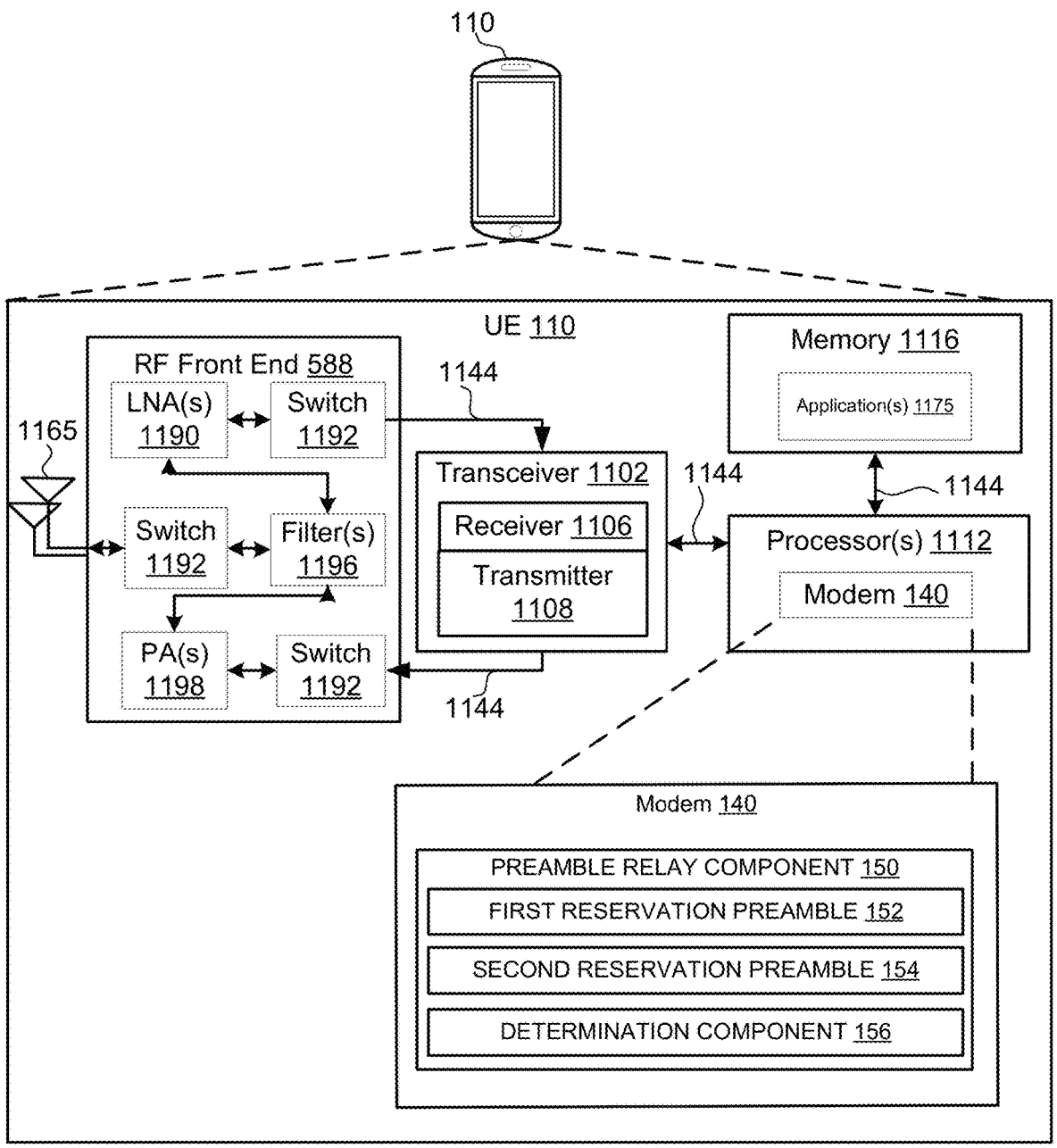
FIG. 11 is a schematic diagram of example components of the UE of FIG. 1.

Referring to FIG. 11, one example of an implementation of an UE 110 may include a variety of components, some of which have already been described above, but including components such as one or more processors 1112 and memory 1116 and transceiver 1102 in communication via one or more buses 1144, which may operate in conjunction with modem 140 and preamble relay component 150 to enable one or more of the functions described herein related to performing measurements during a connected mode in a wireless communication system. Further, the one or more processors 1112, modem 1114, memory 1116, transceiver 1102, radio frequency (RF) front end 1188 and one or more antennas 1165, may be configured to support voice and/or data calls (simultaneously or non-simultaneously) in one or more radio access technologies. In some aspects, the modem 140 may be the same as or similar to the modem 140 (FIG. 1).

In an aspect, the one or more processors 1112 can include a modem 140 that uses one or more modem processors. The various functions related to preamble relay component 150 may be included in modem 140 and/or processors 1112 and, in an aspect, can be executed by a single processor, while in other aspects, different ones of the functions may be executed by a combination of two or more different processors. For example, in an aspect, the one or more processors 1112 may include any one or any combination of a modem processor, or a baseband processor, or a digital signal processor, or a transmit processor, or a receiver processor, or a transceiver processor associated with the transceiver 1102. In other aspects, some of the features of the one or more processors 1112 and/or modem 140 associated with preamble relay component 150 may be performed by transceiver 1102.

Also, memory 1116 may be configured to store data used herein and/or local versions of applications 1175 or preamble relay component 150 and/or one or more of its subcomponents being executed by at least one processor 1112. Memory 1116 can include any type of computer-readable medium usable by a computer or at least one processor 1112, such as random access memory (RAM), read only memory (ROM), tapes, magnetic discs, optical discs, volatile memory, non-volatile memory, and any combination thereof. In an aspect, for example, memory 1116 may be a non-transitory computer-readable storage medium that stores one or more computer-executable codes defining preamble relay component 150 and/or one or more of its subcomponents, and/or data associated therewith, when UE 110 is operating at least one processor 1112 to execute preamble relay component 150 and/or one or more of its subcomponents.

The transceiver 1102 may include at least one receiver 1106 and at least one transmitter 1108. The receiver 1106 may include hardware, firmware, and/or software code executable by a processor for receiving data, the code comprising instructions and being stored in a memory (e.g., computer-readable medium). The receiver 1106 may be, for example, an RF receiver. In an aspect, the receiver 1106 may receive signals transmitted by at least one base station 105. Additionally, the receiver 1106 may process such received signals, and also may obtain measurements of the signals, such as, but not limited to, Ec/Io, SNR, RSRP, RSSI, etc. The transmitter 1108 may include hardware, firmware, and/or software code executable by a processor for transmitting data, the code comprising instructions and being stored in a memory (e.g., computer-readable medium). A suitable example of the transmitter 1108 may include, but is not limited to, an RF transmitter.

Moreover, in an aspect, the UE 110 may include an RF front end 1188, which may operate in communication with one or more antennas 1165 and transceiver 1102 for receiving and transmitting radio transmissions, for example, wireless communications transmitted by at least one base station 105, wireless transmissions received from neighbor UEs 206 and/or 208, or wireless transmissions transmitted by the UE 110. The RF front end 1188 may be connected to one or more antennas 1165 and can include one or more low-noise amplifiers (LNAs) 1190, one or more switches 1192, one or more power amplifiers (PAs) 1198, and one or more filters 1196 for transmitting and receiving RF signals.

In an aspect, the LNA 1190 can amplify a received signal at a desired output level. In an aspect, each LNA 1190 may have a specified minimum and maximum gain values. In an aspect, RF front end 1188 may use one or more switches 1192 to select a particular LNA 1190 and its specified gain value based on a desired gain value for a particular application.

Further, for example, one or more PA(s) 1198 may be used by the RF front end 1188 to amplify a signal for an RF output at a desired output power level. In an aspect, each PA 1198 may have specified minimum and maximum gain values. In an aspect, the RF front end 1188 may use one or more switches 1192 to select a particular PA 1198 and a corresponding specified gain value based on a desired gain value for a particular application.

Also, for example, one or more filters 1196 can be used by the RF front end 1188 to filter a received signal to obtain an input RF signal. Similarly, in an aspect, for example, a respective filter 1196 can be used to filter an output from a respective PA 1198 to produce an output signal for transmission. In an aspect, each filter 1196 can be connected to a specific LNA 1190 and/or PA 1198. In an aspect, the RF front end 1188 can use one or more switches 1192 to select a transmit or receive path using a specified filter 1196, LNA 1190, and/or PA 1198, based on a configuration as specified by transceiver 1102 and/or processor 1112.

As such, the transceiver 1102 may be configured to transmit and receive wireless signals through one or more antennas 1165 via RF front end 1188. In an aspect, the transceiver 1102 may be tuned to operate at specified frequencies such that the UE 110 can communicate with, for example, one or more base stations 105 or one or more cells associated with one or more base stations 105. In an aspect, for example, the modem 140 can configure the transceiver 1102 to operate at a specified frequency and power level based on the UE configuration of the UE 110 and the communication protocol used by the modem 140.

In an aspect, modem 140 can be a multiband-multimode modem, which can process digital data and communicate with the transceiver 1102 such that the digital data is sent and received using the transceiver 1102. In an aspect, the modem 140 can be multiband and be configured to support multiple frequency bands for a specific communications protocol. In an aspect, the modem 140 can be multimode and be configured to support multiple operating networks and communications protocols. In an aspect, the modem 140 can control one or more components of the UE 110 (e.g., RF front end 1188, transceiver 1102) to enable transmission and/or reception of signals from the network based on a specified modem configuration. In an aspect, the modem configuration can be based on the mode of the modem and the frequency band in use. In another aspect, the modem configuration can be based on UE configuration information associated with the UE 110 as provided by the network during cell selection and/or cell reselection.

Figure 12:
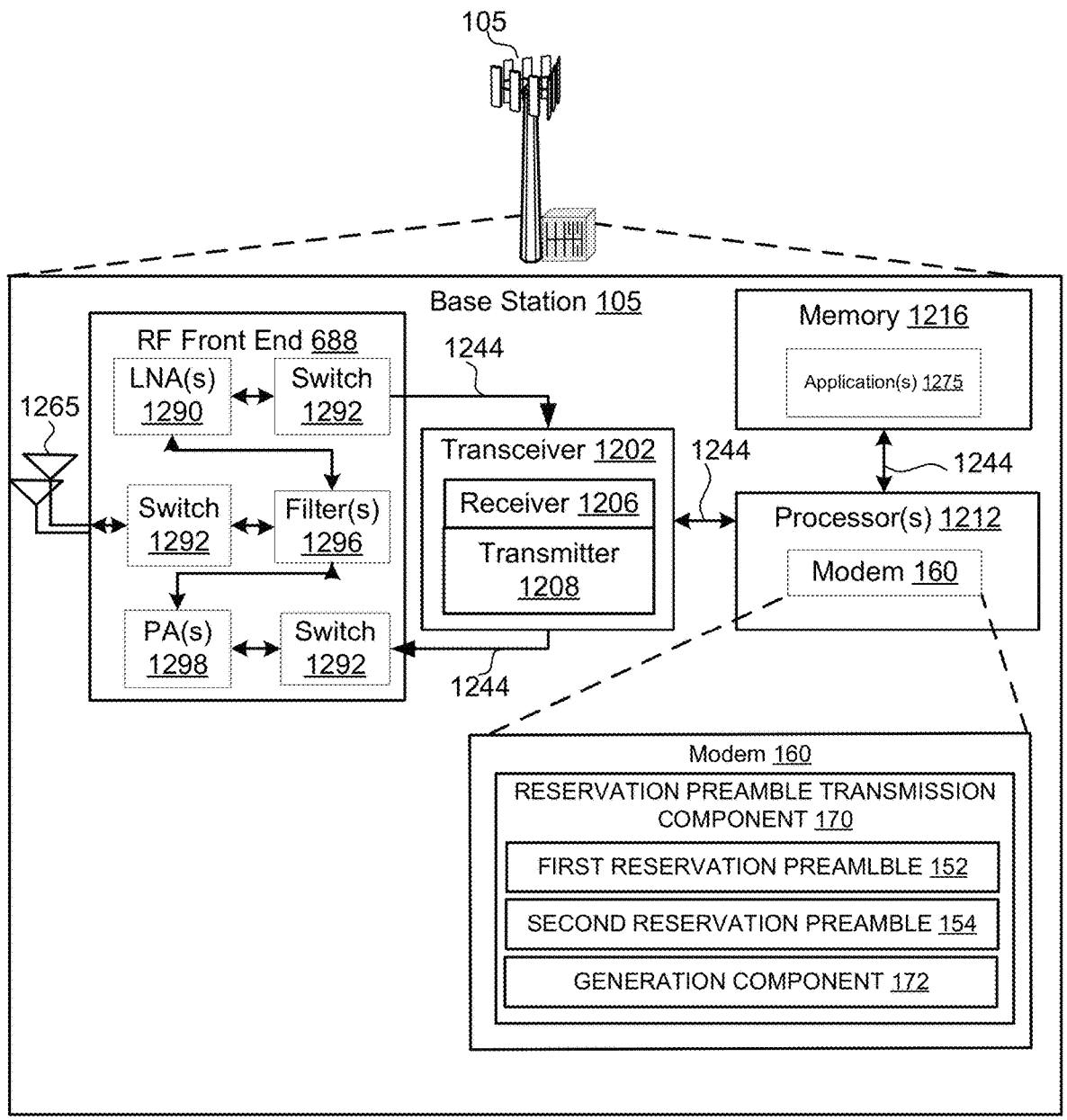
FIG. 12 is a schematic diagram of example components of the base station of FIG. 1.

Referring to FIG. 12, one example of an implementation of base station 105 may include a variety of components, some of which have already been described above, but including components such as one or more processors 1212, a memory 1216, and a transceiver 1202 in communication via one or more buses 1244, which may operate in conjunction with modem 160 and the reservation preamble transmission component 170.

The transceiver 1202, receiver 1206, transmitter 1208, one or more processors 1212, memory 1216, applications 1275, buses 1244, RF front end 1288, LNAs 1290, switches 1292, filters 1296, PAs 1298, and one or more antennas 1265 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of communication at a first network entity, comprising:
   generating a first reservation preamble of a first operator based on at least one of a compressed representation in a signal space, a basis function of the signal space, or a constant amplitude zero autocorrelation waveform (CAZAC) sequences, wherein a time duration of the first reservation preamble includes a plurality of waveform samples of a multi-tone transmission and a switching gap without one or more active transmissions; and
   transmitting, on a first timeslot of multiple time slots of a downlink channel, the first reservation preamble of the first operator to at least a user equipment (UE).

2. The method of claim 1, wherein transmitting, on the first timeslot of the downlink channel, the first reservation preamble of the first operator to at least the UE further comprises transmitting a plurality of uniformly spaced pilot tones corresponding to the first reservation preamble.

3. The method of claim 1, wherein the first network entity includes a plurality of transmit antennas, and wherein transmitting, on the first timeslot of the downlink channel, the first reservation preamble of the first operator to at least the UE further comprises transmitting, on the plurality of transmit antennas, the first reservation preamble by reusing an orthogonal frequency-division multiplexing (OFDM) frame.

4. The method of claim 1, wherein transmitting, on the first timeslot of the downlink channel, the first reservation preamble of the first operator to at least the UE further comprises transmitting the first reservation preamble based on a configurable transmit diversity scheme.

5. The method of claim 4, wherein the configurable transmit diversity scheme includes at least one of a tone interleaving in a frequency domain, a sub-band interleaving in the frequency domain, or a cyclic shift diversity in a time domain.

6. The method of claim 1, further comprising receiving, on the first timeslot of an uplink channel from the UE, a second reservation preamble of the first operator in response to transmitting, on the first timeslot of the downlink channel, the first reservation preamble of the first operator to at least the UE.

7. The method of claim 6, wherein a sequence of the second reservation preamble corresponds to at least one of a punctured or a phase rotated waveform of the first reservation preamble.

8. The method of claim 1, wherein transmitting, on the first timeslot of the downlink channel, the first reservation preamble of the first operator to at least the UE further comprises transmitting the first reservation preamble as a single frequency network (SFN) transmission based on the UE and the first network entity both corresponding to the first operator.

9. The method of claim 1, further comprising transmitting data associated with the first operator within a portion of a transmission opportunity on the downlink channel in response to transmitting the first reservation preamble of the first operator.

10. The method of claim 9, wherein the first reservation preamble of the first operator notifies one or more UEs of the first network entity and at least one of a second network entity that the first network entity will access a channel during the portion of the transmission opportunity.

11. The method of claim 9, further comprising restricting access of one or more network entities to the portion of the transmission opportunity based on a determination that the first reservation preamble of the first operator has been transmitted by at least the first network entity.

12. An apparatus for wireless communications, comprising:
- a memory; and
- a processor coupled to the memory and configured to:
    - generate a first reservation preamble of a first operator based on at least one of a compressed representation in a signal space, a basis function of the signal space, or a constant amplitude zero autocorrelation waveform (CAZAC) sequences, wherein a time duration of the first reservation preamble includes a plurality of waveform samples of a multi-tone transmission and a switching gap without one or more active transmissions; and
    - transmit, on a first timeslot of multiple time slots of a downlink channel, the first reservation preamble of the first operator to at least a user equipment (UE).

13. The apparatus of claim 12, wherein the processor configured to transmit, on the first timeslot of the downlink channel, the first reservation preamble of the first operator to at least the UE is further configured to transmit a plurality of uniformly spaced pilot tones corresponding to the first reservation preamble.

14. The apparatus of claim 12, wherein the first network entity includes a plurality of transmit antennas, and wherein transmitting, on the first timeslot of the downlink channel, the first reservation preamble of the first operator to at least the UE further comprises transmitting, on the plurality of transmit antennas, the first reservation preamble by reusing an orthogonal frequency-division multiplexing (OFDM) frame.

15. The apparatus of claim 12, wherein the processor configured to transmit, on the first timeslot of the downlink channel, the first reservation preamble of the first operator to at least the UE is further configured to transmit the first reservation preamble based on a configurable transmit diversity scheme.

16. The apparatus of claim 15, wherein the configurable transmit diversity scheme includes at least one of a tone interleaving in a frequency domain, a sub-band interleaving in the frequency domain, or a cyclic shift diversity in a time domain.

17. The apparatus of claim 12, wherein the processor is further configured to receive, on the first timeslot of an uplink channel from the UE, a second reservation preamble of the first operator in response to transmitting, on the first timeslot of the downlink channel, the first reservation preamble of the first operator to at least the UE.

18. The apparatus of claim 17, wherein a sequence of the second reservation preamble corresponds to at least one of a punctured or phase rotated waveform of the first reservation preamble.

19. The apparatus of claim 12, wherein the processor configured to transmit, on the first timeslot of the downlink channel, the first reservation preamble of the first operator to at least the UE is further configured to transmit the first reservation preamble as a single frequency network (SFN) transmission based on the UE and the first network entity both corresponding to the first operator.

20. The apparatus of claim 12, further comprising transmitting data associated with the first operator within a portion of a transmission opportunity on the downlink channel in response to transmitting the first reservation preamble of the first operator.

21. The apparatus of claim 20, wherein the first reservation preamble of the first operator notifies the first network entity and at least one of a second network entity that the first network entity will access a channel during the portion of the transmission opportunity.

22. The apparatus of claim 20, wherein the processor is further configured to restrict access of one or more network entities to the portion of the transmission opportunity based on a determination that the first reservation preamble of the first operator has been transmitted by at least the first network entity.

23. An apparatus for wireless communications, comprising:
- means for generating a first reservation preamble of a first operator based on at least one of a compressed representation in a signal space, a basis function of the signal space, or a constant amplitude zero autocorrelation waveform (CAZAC) sequences, wherein a time duration of the first reservation preamble includes a plurality of waveform samples of a multi-tone transmission and a switching gap without one or more active transmissions; and
- means for transmitting, on a first timeslot of multiple time slots of a downlink channel, the first reservation preamble of the first operator to at least a user equipment (UE).

24. A non-transitory computer-readable medium storing computer executable code for wireless communications, comprising code for:
- generating a first reservation preamble of a first operator based on at least one of a compressed representation in a signal space, a basis function of the signal space, or a constant amplitude zero autocorrelation waveform (CAZAC) sequences, wherein a time duration of the first reservation preamble includes a plurality of waveform samples of a multi-tone transmission and a switching gap without one or more active transmissions; and
- transmitting, on a first timeslot of multiple time slots of a downlink channel, the first reservation preamble of the first operator to at least a user equipment (UE).

25. A method of communication at a user equipment (UE), comprising:
- determining whether a first reservation preamble of a first operator is received on a first time slot of multiple time slots of a downlink channel from a first network entity, wherein a time duration of the first reservation preamble includes a plurality of waveform samples of a multi-tone transmission and a switching gap without one or more active transmissions; and
- transmitting a second reservation preamble of the first operator on an uplink channel to a second network entity based on a determination that the first reservation preamble of the first operator is received.

26. An apparatus for wireless communications at a user equipment (UE), comprising:
- a memory; and
- a processor coupled to the memory and configured to:
    - determine whether a first reservation preamble of a first operator is received on a first time slot of multiple time slots of a downlink channel from a first network entity, wherein a time duration of the first reservation preamble includes a plurality of waveform samples of a multi-tone transmission and a switching gap without one or more active transmissions; and
    - transmit a second reservation preamble of the first operator on an uplink channel to a second network entity based on a determination that the first reservation preamble of the first operator is received.

27. An apparatus for wireless communications at a user equipment (UE), comprising:
- means for determining whether a first reservation preamble of a first operator is received on a first time slot of multiple time slots of a downlink channel from a first network entity, wherein a time duration of the first reservation preamble includes a plurality of waveform samples of a multi-tone transmission and a switching gap without one or more active transmissions; and
- means for transmitting a second reservation preamble of the first operator on an uplink channel to a second network entity based on a determination that the first reservation preamble of the first operator is received.

28. A non-transitory computer-readable medium storing computer executable code for wireless communications at a user equipment (UE), comprising code for:
- determining whether a first reservation preamble of a first operator is received on a first time slot of multiple time slots of a downlink channel from a first network entity, wherein a time duration of the first reservation preamble includes a plurality of waveform samples of a multi-tone transmission and a switching gap without one or more active transmissions; and
- transmitting a second reservation preamble of the first operator on an uplink channel to a second network entity based on a determination that the first reservation preamble of the first operator is received.

\* \* \* \* \*